Nov. 24, 1964  C. S. CLAY, JR  3,158,830
SIGNAL CORRELATION METHOD AND MEANS
Filed April 4, 1961  4 Sheets-Sheet 1

INVENTOR.
CLARENCE S. CLAY, JR.
BY
Philip Schneider
ATTORNEY

Nov. 24, 1964   C. S. CLAY, JR   3,158,830
SIGNAL CORRELATION METHOD AND MEANS
Filed April 4, 1961   4 Sheets-Sheet 3

INVENTOR.
CLARENCE S. CLAY, JR
BY
Philip Schneider
ATTORNEY

United States Patent Office 3,158,830
Patented Nov. 24, 1964

3,158,830
SIGNAL CORRELATION METHOD AND MEANS
Clarence S. Clay, Jr., Hastings, N.Y., assignor to the United States of America
Filed Apr. 4, 1961, Ser. No. 113,973
2 Claims. (Cl. 340—3)

This invention relates to signal correction means and methods and more particularly to a method and apparatus of this kind which can be employed for depth measurements in noisy media.

The present invention has particular, although not exclusive, utility in the field of oceanic depth measurement and will therefore be described relative to its application in this field. It should be noted that the term "oceanic depth measurement" refers, in this application, not only to measurement of the depth of the water but also to depth measurements of the earth layers below.

Deep-sea geophysical work has inherent difficulties and, thus far, the principal effort has employed long refraction profiles to determine basic structure. Some sub-bottom reflection data has been obtained albeit with difficulty, since it is not easy to maintain proper control of all parameters under deep sea conditions.

A number of efforts to adapt seismic reflection techniques to oceanographic geophysics have been made. Oil prospecting techniques have been successful but expensive. The most attractive approach has been with a low-frequency fathometer.

One of the reflection techniques which has been utilized for depth measurement employs a seismographic recording of the sound reflected from a charge of dynamite exploded in the ocean. However, a one-trace, one-shot seismogram is inadequate to identify reflections in the presence of any interferences, so several receiving stations are used. The function of arrival time vs. distance for the direct arrival is different from that of the reflection and is dependent upon the velocity of sound and the depth to the reflecting surface. For the reflection from a layer underneath, it is dependent upon the properties of all layers above the lowest reflecting layer. The experimental determination of the function of reflection time vs. distance is the objective of geophysical measurements.

The difficulty in oceanic measurements arises from the fact that the noise level in the ocean is quite high and acts to camouflage or mask the propagated signals. The problem becomes one of selecting or identifying the propagated signal from the background of noise in which it is lost, and amplifying or operating upon the propagated signal so that its travel time can be measured. If the travel time and the speed at which the propagated signal travels are known, the distance it has covered is easily calculated. Finding the depth of the ocean and the sub-bottom earth layers then becomes a mere matter of trigonometry.

Hereafter in this application, the following definitions will be used:

Generated signal—this denotes the original signal before its transmission through the water;

Propagated signal—this denotes the original signal as received at the receiving station after its transmission through the water;

Received signal—this denotes the total signal received at the receiving station comprising both noise and propagated signal components;

Correlation—an operation by which the received signal is compared with the original generated signal in an attempt to establish the mutual relationship therebetween;

Matching—that part of the operation of correlation in which the mutual relationship, or similarity, of a portion of the received signal and the original generated signal is established.

The present invention utilizes signal correlation techniques to match a propagated signal with a non-repetitive generated signal and to produce a representative signal from the propagated signals, the representative signal having the same time relation to the original generated signal as the propagated signal has. In a typical embodiment, the invention comprises a non-repetitive-signal generating means, transducing and transmitting means immersed in the medium, receiver transducer means immersed in the medium, receiver means, signal correlation means and signal display means, the signal travelling from one said means to the others in the same order as that in which the means have been listed. The signal correlation means or the signal display means may preferably include means to measure the travel time of the propagated signal.

An object of the invention is to identify a propagated signal which is camouflaged by, or lost in, a background of noise.

Another object is to measure the time of travel of a propagated signal.

A further object is to measure the time of travel of a signal propagated through a noisy environment.

Yet another object is to measure depth in a marine environment.

Other objects and many of the attendant advantages of this invention will be readily appreciated as the same becomes better understood by reference to the following detailed description when considered in connection with the accompanying drawings wherein.

Figure 1:
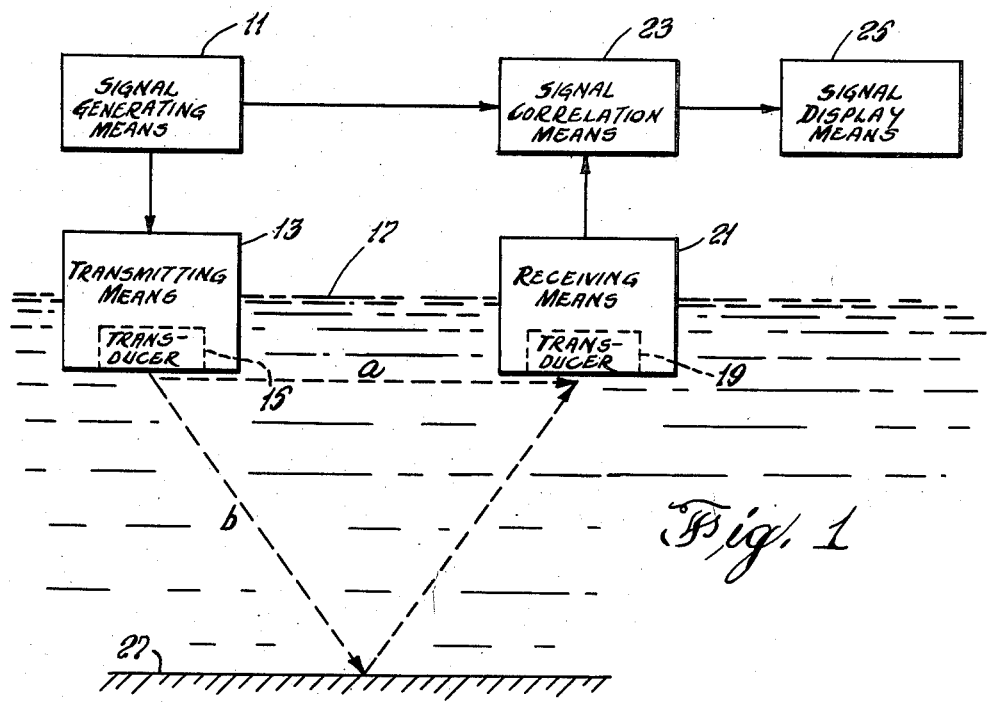
FIG. 1 is a block diagram illustrating a generalized conception of the invention.

FIG. 1 shows, in block form, a generalized conception of the invention in accordance with the functions performed by its various components. A non-repetitive electrical signal, such as noise, is generated by the signal generating means 11. The generated signal is applied to the transmitting means 13 which amplifies it and drives a transducer 15 which is immersed in the propagating medium, in this case sea water. The transducer 15 converts the electrical energy into sound energy, and is located just beneath the surface 17 of the water.

Propagated signals and extraneous noise are received by the receiving transducer 19, which is part of the receiving means 21, reconverted to electrical energy and amplified. The received signal is then correlated or matched with the original signal, and a signal representative of the propagated signal is produced, the matching and the producing of a representative signal being effected by the signal correlation means 23. The representative signal is now displayed by the signal display means 25.

The signal identification means 23 or the signal display means 25 may also include means for measuring the time of the representative signal, that is, the difference in time between the start of the original generated signal (zero time) and the reception of the propagated signal.

Two propagated signals are received, the first being the one which travels the direct path ($a$) between transmitting and receiving transducers, and the second being the one which is reflected from the sea-bottom 27 and travels the longer path ($b$).

Figure 2:
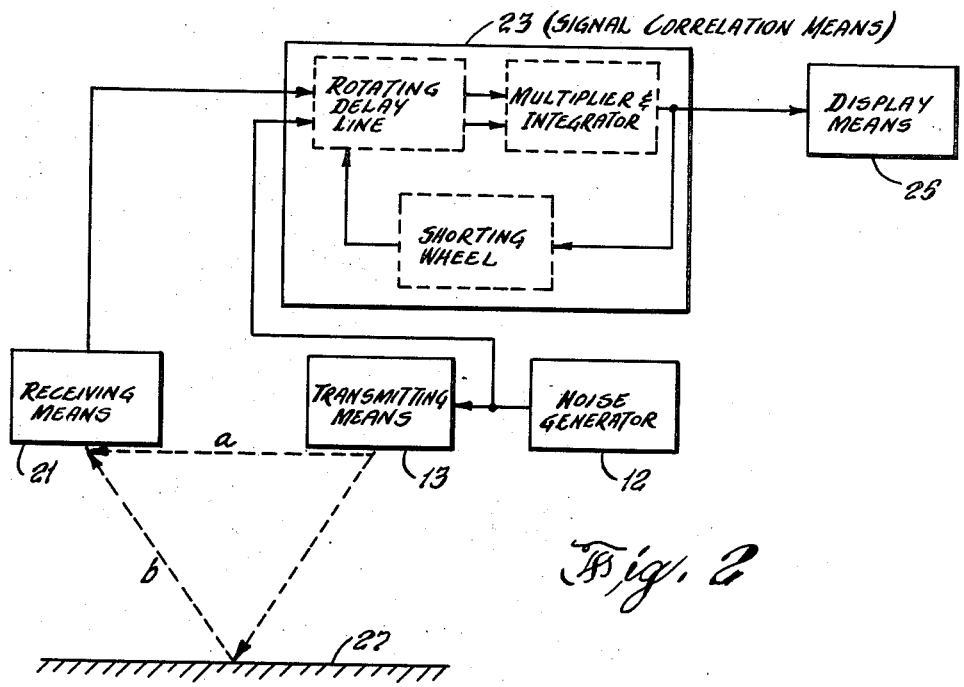
FIG. 2 is a block diagram illustrating a first embodiment of the invention.

FIG. 2 illustrates a first embodiment of the invention which employs a type of signal correlation means 23 which receives the generated signal and the received signals as inputs. The received signal is then delayed. As the delay time is increased, a point is attained at which the delay time equals the time of travel of the propagated direct signal (over path $a$). The received signal and the original signal are matched at this time and give a distinctly greater output when passed through the multiplier and integrator than unmatched signals provide. (Unmatched signals are not in phase and tend to cancel rather than to add.)

As the delay is increased still further, a point is reached at which the delay time equals the time of travel of the propagated reflected signal (over path $b$). The received signal and the original signal again match each other at this time and again a large output signal is obtained from the signal correlation means 23.

An example of this type of signal correlation means is described in Hudson Laboratories Technical Report No. 71, Columbia University, New York, entitled "The Tracking of an Omnidirectional Noise Source Through the Two-Dimensional Correlation Function," by H. Schimmel. (The report is available at the Armed Services Technical Information Agency (ASTIA) Document Section, Arlington, Va.) It is also fully described in patent application Serial No. 835,156, filed 20 Aug. 1959, for "Delay Line Time Compressor" by H. Schimmel and C. S. Clay now U.S. Patent No. 3,106,705. Other signal correlation means which perform the functions of delaying one signal with respect to another and producing a representative signal when the delayed signal and the other signal are matched may also be utilized. The angular difference, $\phi$, between the zero positions of the two halves of the split wheel of the rotating delay line in the signal correlation means 23 is directly proportional to the time of travel of the propagated signal and a direct calibration in terms of time may be made.

The display means 27 may, for example, be a pen recorder or facsimile recorder such as the Alden Recorder or the Times Fax Recorder, both of the latter being commercially available recorders.

In most types of pen recorder, the pen moves from a reference (zero) position across the paper at a known speed, so that its distance from the reference position is also equivalent to time. The position of the representative signal on the record may then be read off directly as the travel time of the propagated signal. In this case, means for measuring travel time need not be included as part of the signal correlation means 23.

The noise generator 12 may, for example, be the commercially available General Radio Noise Generator, a band-limited noise generator. Band-limitation is employed because marine noise sources are much easier to operate continuously at low levels when the noise band is limited.

Figure 3:
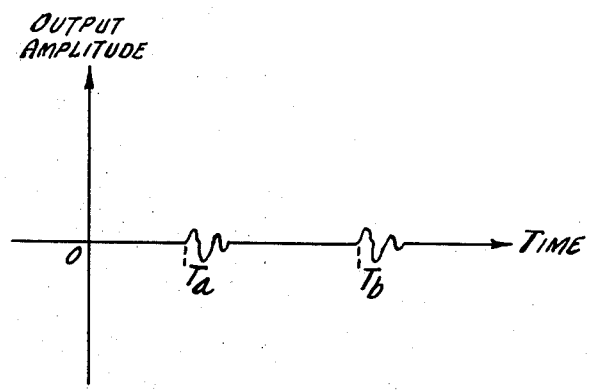
FIG. 3 is a diagrammatic representation of the output derived from the signal correlation means of the embodiment of FIG. 2.

FIG. 3 is a diagrammatic illustration of the output of the signal correlation means 23 with respect to time as a base. Zero time is the time at which the transmission of the generated noise signal is begun. A first signal at $T_a$ indicates the representative signal produced when the propagated direct signal and the original generated signal are matched, and a second signal at $T_b$ indicates the representative signal produced when the propagated reflected signal and the original generated signal are matched.

Figure 4:
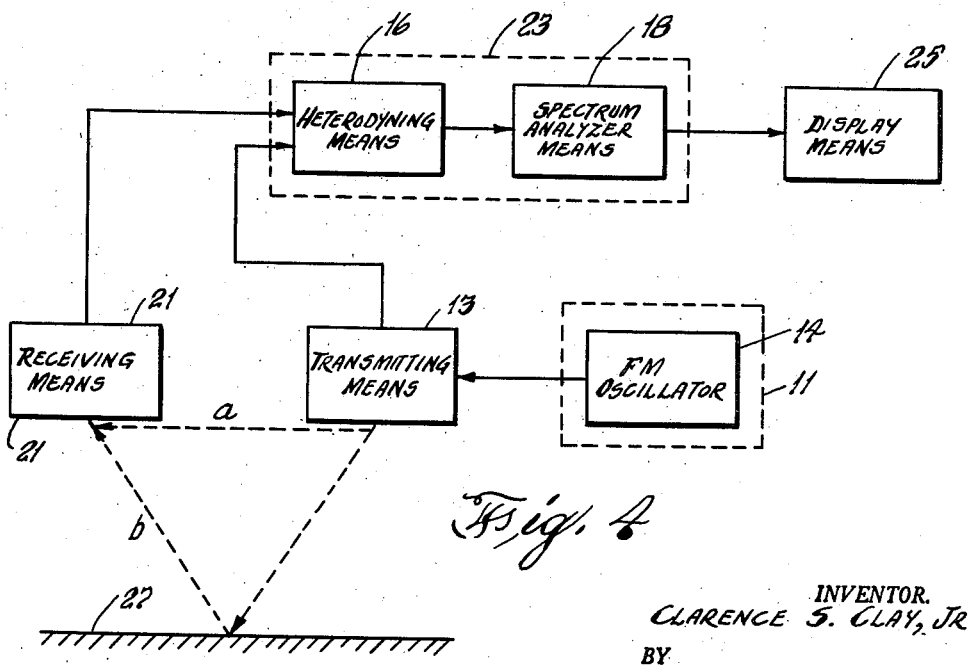
FIG. 4 is a block diagram illustrating a second embodiment of the invention.

FIG. 4 illustrates a second embodiment of the invention in which the signal generating means is a frequency-modulated oscillator 14, which may, for example, have a frequency-modulated sine wave output. This output is applied to the transmitting means 13, which includes a sound transducer immersed in the marine medium and may include a driver amplifier, if necessary. A receiving means 21 receives the direct propagated signal over path ($a$), the reflected propagated signal over path ($b$), and any extraneous noise signals originating in the marine medium. The received sounds are changed into electrical energy by the receiving means 21 and applied to the signal correlation means 23 which in this case comprises heterodyning means 16 and spectrum analyzer means 18. The heterodyning means 16 combines the original generated signal with the received propagated signals to give two signals of constant frequency, the first being the difference frequency between the original generated signal and the direct propagated signal, and the second being the difference frequency between the original generated signal and the reflected propagated signal.

Figure 5:
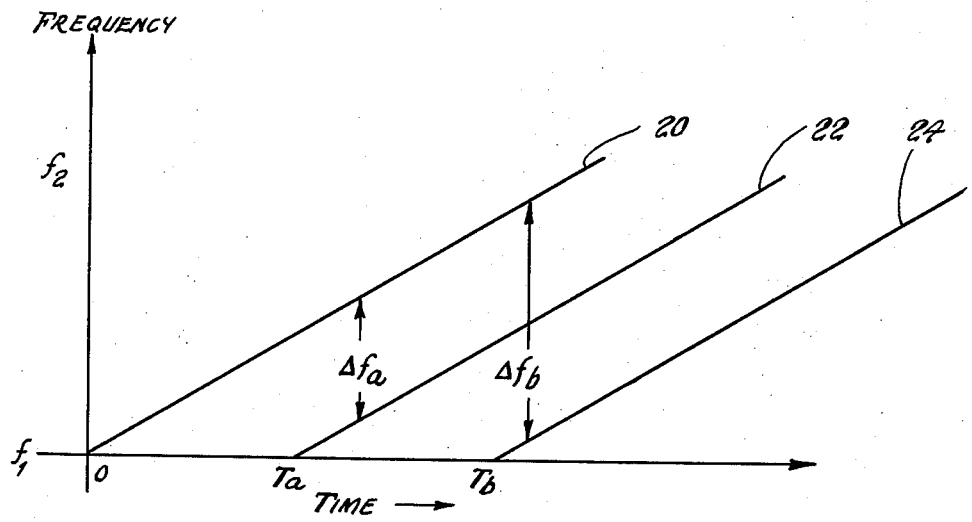
FIG. 5 is a diagrammatic representation of the frequency-time relations of the original generated signal, the direct propagated signal and the reflected propagated signal of the invention as embodied in FIG. 4.
Figure 6:
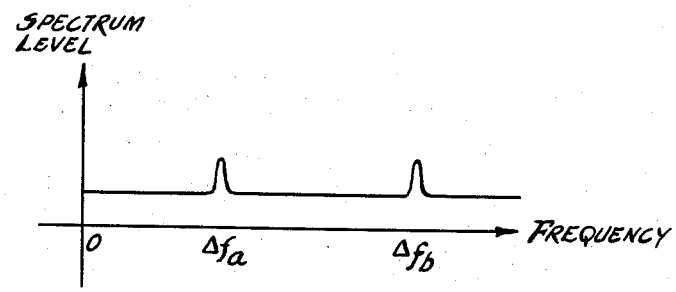
FIG. 6 is a diagrammatic representation of the output derived from the signal correlation means of the embodiment of FIG. 4.

The two heterodyne signals are applied to the spectrum analyzer means 18, the output of which is a pair of spike signals at the difference frequencies previously mentioned. These are displayed on the display means 25, which may be an oscilloscope or the display means mentioned in connection with the embodiment of FIG. 2. FIG. 5 shows, on a time base, the frequency characteristic of the original generated signal 20, the frequency characteristic of the direct propagated signal 22 and the frequency of the reflected propagated signal 24. $T_a$ is the time at which the direct propagated signal begins to be received and $T_b$ is the time at which the reflected propagated signal begins to be received. There is a fixed difference in frequency ($\Delta f_a$) between the original generated signal 20 and the direct propagated signal 22 and a different fixed difference in frequency ($\Delta f_b$) between the original generated signal 20 and the reflected propagated signal 24. The spectrum analyzer means 18 sweeps through a band of frequencies which includes these difference frequencies and the output of the spectrum analyzer means 18 is a pair of spikes at ($\Delta f_a$) and ($\Delta f_b$), as shown in FIG. 6. Since the rate at which the frequency of the output signal of the FM oscillator 14 is changing is known, all frequency differences, such as ($\Delta f_b$), are proportional to time and the display means 25 can be calibrated to show the position of the spikes in terms of time.

An example of apparatus which may be employed as the heterodyning means 16 is provided in FIG. 1 of the article "Some Aspects of the Design of Balanced Rectifier Modulators for Precision Application" by D. G. Tucker published by the Institution of Electrical Engineers, London Journal 95: 161–172, 1948. Commercial spectrum analyzers, such as the Kay Sona-graph, manufactured by the Kay Electric Co. of Pine Brook, N.J., are available for use as the spectrum analyzer means 18.

Figure 7:
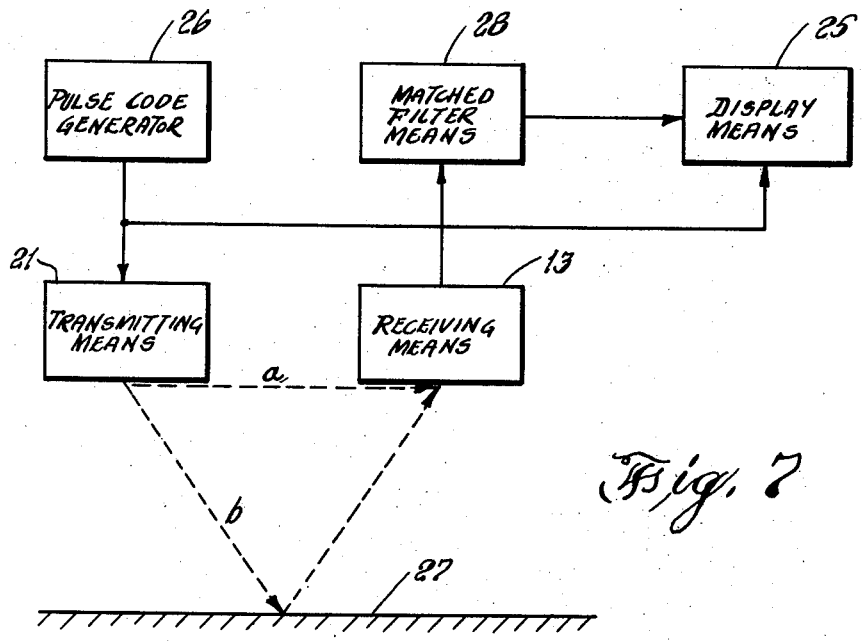
FIG. 7 is a block diagram illustrating a preferred embodiment of the invention.
Figure 8:
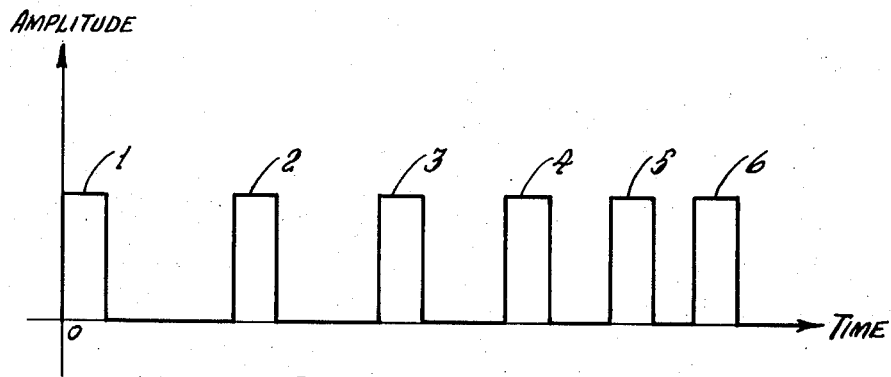
FIG. 8 is a diagrammatic representation of the signal produced by the pulse code generator of the embodiment of the invention illustrated in FIG. 7.

A third and preferred embodiment of the invention is shown in FIG. 7. This embodiment employs a pulse code generator 26 as the signal generating means 11 and matched filter means 28 as the signal correlation means 23. The pulse code generator 26 may, for example, put out a coded signal as shown in FIG. 8 comprising a series of impulses 1 through 6, the time separation between each succeeding impulse being smaller than the preceding by a predetermined amount. This type of signal can easily be produced by a free-running multivibrator which is biased by the output from a sawtooth wave generator; the higher the biasing output, the faster the repetition rate of the multivibrator becomes. Any other suitable means may alternatively be employed.

The matched filter means 28 is the type of device described on pages 274 and 275 and shown in Fig. 20 of E. J. Baghdady's book, "Lectures on Communication System Theory," published by McGraw-Hill, New York, 1961; other references are also provided by this book. This type of matched filter means includes a delay line of a number of sections. Output taps are arranged so that input impulses are delayed inversely in proportion to the time separations between the impulses of the original generated signal. When a signal applied to the delay line matches the original generated signal, each successive impulse is delayed by just the right amount of time to permit all impulses to arrive at a summing network simultaneously, so that the output of the summing network is the sum of all impulses in the received matching signal. Such a summed output signal indicates that the matching signal is the received propagated signal, since the chance that a series of noise impulses will have exactly the same time sequence as the original generated signal is very remote.

The summed output of the matched filter means 28 is applied to the display means, which may, for example, be any of the devices previously mentioned in connection with the other embodiments of the invention. The signal from the pulse code generator 26 may be used to start the time base of the display means 25 so that a zero reference time is established.

Obviously many modifications and variations of the present invention are possible in the light of the above teachings. It is therefore to be understood that within the scope of the appended claims the invention may be practiced otherwise than as specifically described.

I claim:
1. A signal correlation device for use in a noisy medium comprising, in combination: signal generating means for producing a pulse-coded electrical signal having a plurality of successive impulses, the time separation of the impulses being in accordance with a predetermined schedule; transducing means for changing said electrical signal into a corresponding sound signal and for propagating said sound signal in said noisy medium; receiving means for receiving sound signals from the noisy medium and for changing the received sound signals into corresponding electrical signals; matched-filter signal delay means for delaying said corresponding electrical signals in inverse relation to the time relationships between succeeding impulses of the original generated pulse-coded signal, so that the individual impulses of any portion of said corresponding electrical signals which matches the time schedule of said original generated signal are delayed by different amounts of time to allow all the impulses to pass out of said delay means simultaneously; signal combination means for combining all impulses simultaneously proceeding from said delay means and producing a representative signal therefrom; and means for indicating said representative signal.

2. A device as set forth in claim 1, further including means for determining the time of occurrence of said representative signal relative to the start of said original generated pulse-coded signal.

References Cited by the Examiner
UNITED STATES PATENTS

| | | | |
|---|---|---|---|
| 2,253,975 | 8/41 | Guanella | 340—3 |
| 2,410,233 | 10/46 | Percival | 340—3 |
| 2,688,124 | 8/54 | Doty et al. | 340—15 |
| 2,706,810 | 4/55 | Jacobsen | 333—29 X |
| 2,724,817 | 11/55 | Hisserich | 340—3 |
| 2,817,832 | 12/57 | Mathes | 340—3 |
| 2,885,590 | 5/59 | Fuller | 315—1 |
| 2,958,039 | 10/60 | Anderson | 324—77 |
| 2,977,543 | 3/61 | Lutz et al. | 333—29 X |
| 2,977,568 | 3/61 | Roshon et al. | 340—3 |
| 3,016,513 | 1/62 | Van Dyke | 340—3 |
| 3,064,234 | 11/62 | Barrett | 340—3 |
| 3,090,953 | 5/63 | Frank | 343—17.1 |

OTHER REFERENCES

"Delay Line Specifications for Matched-Filter Communications Systems," by Lerner et al., IRE Transactions on Component Parts, vol. CP6, No. 4, December 1959 (pp. 263–268 relied on).

"Getting High Range Resolution With Pulse Compression Radar," by Ohmann, Electronics, Oct. 7, 960 (pp. 53–57 relied on).

KATHLEEN H. CLAFFY, *Primary Examiner.*
CHESTER L. JUSTUS, *Examiner.*